(12) United States Patent
Shimizu

(10) Patent No.: US 9,505,313 B2
(45) Date of Patent: Nov. 29, 2016

(54) VEHICLE-SIDE CONNECTOR WITH A RELAY-CIRCUIT UNIT

(71) Applicant: Sumitomo Wiring Systems, Ltd., Yokkaichi, Mie (JP)

(72) Inventor: Tooru Shimizu, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 0 days.

(21) Appl. No.: 14/775,736

(22) PCT Filed: Mar. 19, 2013

(86) PCT No.: PCT/JP2013/057889
§ 371 (c)(1),
(2) Date: Sep. 14, 2015

(87) PCT Pub. No.: WO2014/147762
PCT Pub. Date: Sep. 25, 2014

(65) Prior Publication Data
US 2016/0031336 A1 Feb. 4, 2016

(51) Int. Cl.
*H01R 13/66* (2006.01)
*B60L 11/18* (2006.01)
*H01R 13/436* (2006.01)

(52) U.S. Cl.
CPC ......... *B60L 11/1818* (2013.01); *H01R 13/436* (2013.01); *H01R 13/4367* (2013.01); *H01R 13/6616* (2013.01); *Y02T 10/7005* (2013.01); *Y02T 10/7072* (2013.01); *Y02T 90/14* (2013.01)

(58) Field of Classification Search
CPC .......... H01R 13/6616; H01R 13/6625; H01R 13/6641; H01R 13/665; H01R 13/6666
USPC ........ 439/620.04, 620.13, 304, 310; 320/109
See application file for complete search history.

(56) References Cited

U.S. PATENT DOCUMENTS

2012/0231644 A1* 9/2012 Kinoshita ............. H01R 13/111
439/205
2012/0258617 A1* 10/2012 Osawa ............... H01R 13/5227
439/205

(Continued)

FOREIGN PATENT DOCUMENTS

| JP | 2009-87870 | 4/2009 |
| JP | 2009-259553 | 11/2009 |
| JP | 2012-221612 | 11/2012 |
| JP | 2013-5520 | 1/2013 |

OTHER PUBLICATIONS

International Search Report.

*Primary Examiner* — Tho D Ta
*Assistant Examiner* — Thang Nguyen
(74) *Attorney, Agent, or Firm* — Gerald E. Hespos; Michael J. Porco; Matthew T. Hespos

(57) ABSTRACT

A vehicle-side connector (10) is provided for connection to a battery mounted in a vehicle. The vehicle-side connector (10) includes a housing (20) configured so that a charging connector (90) is connected thereto. Vehicle-side terminals (40) individually are accommodated in cavities (28) in the housing (20) and are configured to be connected individually to charging terminals (93) in the charging connector (90) when the housing (20) and a charging connector (90) are connected. A retainer (50) is configured to retain the vehicle-side terminals (40) in the cavities (28). A resistance circuit unit (70) is assembled into the retainer (50) and has a relay terminal (73) arranged on a left side connected to a vehicle-side signal terminal (40B) and a relay terminal (73) arranged on a right side is connected to a vehicle-side ground terminal (40C) out of the vehicle-side terminals (40).

7 Claims, 18 Drawing Sheets

(56) References Cited

U.S. PATENT DOCUMENTS

| | | | | |
|---|---|---|---|---|
| 2012/0295460 A1* | 11/2012 | Ichio | ................. | H01R 13/5208 439/205 |
| 2012/0318783 A1* | 12/2012 | Kamachi | .............. | H05B 1/0236 219/497 |
| 2014/0329411 A1* | 11/2014 | Montena | ............ | H01R 13/6616 439/620.04 |

* cited by examiner

VEHICLE-SIDE CONNECTOR WITH A RELAY-CIRCUIT UNIT

BACKGROUND

1. Field of the Invention

The present invention relates to a vehicle-side connector.

2. Description of the Related Art

A vehicle-side connector to be connected to a battery mounted in a vehicle is known, for example, from Japanese Unexamined Patent Publication No. 2012-221612. A charging connector connected to a power supply is connectable to this vehicle-side connector and the battery is charged by properly connecting the vehicle-side connector and the charging connector.

Further, a plurality of wires are drawn out from the vehicle-side connector and a relay circuit including a resistor is provided among these wires. When the vehicle-side connector and the charging connector are connected, the relay circuit is closed and a predetermined voltage value corresponding to the resistor is transmitted to a controller on a vehicle side, whereby a connected state of the vehicle-side connector and the charging connector is detected. Such a technology is described in Japanese Unexamined Patent Publication No. 2013-5520.

In the case of constructing a relay circuit including an electronic component such as a resistor as described above, the electronic component is soldered and molded between wires such as a ground line and a signal line drawn out from the vehicle-side connector. Thus, man-hours for constructing the relay circuit are increased. Further, since a mounting space for the vehicle-side connector is limited with the enlargement of the battery, space saving of the relay circuit has been desired.

The present invention was completed based on the above situation and an object thereof is to reduce man-hours for constructing a relay circuit and realize space saving of the relay circuit.

To achieve the above object, the present invention is directed to a vehicle-side connector to be connected to a battery mounted in a vehicle, including a housing configured such that a charging connector is connected thereto, a plurality of vehicle-side terminals individually accommodated into a plurality of cavities provided in the housing and configured to be individually connected to a plurality of charging terminals provided in the charging connector when the housing and the charging connector are connected, a retainer configured to retain the vehicle-side terminals accommodated in the cavities, and a relay circuit unit assembled into the retainer and having one end connected to one of the plurality of vehicle-side terminals and the other end connected to the vehicle-side terminal different from that connected to the one end out of the plurality of vehicle-side terminals.

SUMMARY

According to the vehicle-side connector thus configured, a relay circuit can be provided between one of the plurality of vehicle-side terminals and the vehicle-side terminal different from the one vehicle-side terminal only by assembling the relay circuit unit into the retainer. In this way, man-hours for constructing the relay circuit can be reduced, for example, as compared with the case where the relay circuit is constructed between wires drawn out from the vehicle-side connector.

Further, since the relay circuit unit is assembled into the retainer, space saving of the relay circuit can be realized as compared with the case where the relay circuit is provided between the wires drawn out from the vehicle-side connector.

The following configurations are preferable as embodiments of the present invention.

The relay circuit unit may include an electronic component with a pair of leads, a first relay terminal press-fittable into the retainer and to be connected to one of the leads in the electronic component and a second relay terminal press-fittable into the retainer and to be connected to the other lead in the electronic component, and the leads may be pressed by the retainer to be respectively connected to lead connecting portions provided on the first and second relay terminals when the first and second relay terminals are press-fitted into the retainer.

According to such a configuration, the first and second relay terminals are connected to the electronic component to construct the relay circuit unit only by press-fitting the first and second relay terminals of the relay circuit unit into the retainer. This can facilitate a connecting operation of the leads and the lead connecting portions as compared with the case where each relay terminal is soldered or crimped to the lead of the electronic component and can reduce man-hours for connecting the leads and the lead connecting portions.

The lead connecting portion may include a pair of pressure contact blades to be brought into pressure contact with the lead pushed by being pressed by the retainer.

According to such a configuration, the structure of the lead connecting portion can be simplified as compared with the case where the lead connecting portion is provided with a resilient contact piece or the like to be resiliently brought into contact with the lead.

The retainer may include holding grooves into which the vehicle-side terminals are mounted and held when the vehicle-side terminals are inserted into the cavities, the first and second relay terminals may include a terminal connecting portion projecting into the holding groove and resiliently displaceable, and the vehicle-side terminal may be pressed against the terminal connecting portion in a mounting direction when the vehicle-side terminal is mounted and held into the holding groove.

According to such a configuration, each relay terminal and the vehicle-side terminal can be connected only by mounting the vehicle-side terminal into the holding groove holding the relay terminal in inserting the vehicle-side terminal into the cavity. This enables each relay terminal and the vehicle-side terminal to be easily connected and can reduce man-hours for connecting each relay terminal and the vehicle-side terminal, for example, as compared with the case where the relay terminal and the vehicle-side terminal are connected by soldering or crimping.

The first and second relay terminals may include a press-fit portion to be press-fitted into the retainer, and the terminal connecting portion may be bent and folded in a press-fitting direction of the press-fit portion after extending in a direction opposite to the press-fitting direction from an end part on a side opposite to the press-fitting direction.

In the case of a terminal connecting portion having a small resilient displacement amount in a mounting direction, a vehicle-side terminal cannot be firmly pressed against the terminal connecting portion and connection reliability between the vehicle-side terminal and the terminal connecting portion may be reduced if manufacturing tolerances and assembly tolerances are large. In view of this, as a means to increase a displacement amount of the terminal connecting portion in the mounting direction, it is, for example, considered to ensure a large displacement amount of the terminal connecting portion resiliently displaceable in the mounting direction by extending the terminal connecting portion long in a press-fitting direction while extending the terminal connecting portion in a direction intersecting with the press-fitting direction. However, in such a case, the terminal connecting portion becomes long in the press-fitting direction of the press-fit portion and the relay terminal is enlarged. However, according to the present invention, the terminal connecting portion is folded back in the press-fitting direction, whereby it is possible to ensure a large displacement amount of the terminal connecting portion while miniaturizing each relay terminal as compared with the case where the terminal connecting portion is extended long in the press-fitting direction.

An end part of the lead connecting portion on a side opposite to the press-fitting direction may cover the terminal connecting portion.

According to such a configuration, this end part can serve as a protection wall for protecting the terminal connecting portion against breakage due to the contact of another member or the like. This can simplify the structure of each relay terminal as compared with the case where the relay terminal is separately provided with a protection wall for protecting the terminal connecting portion.

The electronic component may be a resistor, the vehicle-side terminal to be connected to the first relay terminal may be a vehicle-side ground terminal, and the vehicle-side terminal to be connected to the second relay terminal may be a vehicle-side signal terminal.

According to such a configuration, a resistance circuit can be provided between the vehicle-side ground terminal and the vehicle-side signal terminal without connecting the resistor between a ground line connected to the vehicle-side ground terminal and a signal line connected to the vehicle-side signal terminal using solder or the like.

The first and second relay terminals may be identically shaped.

According to such a configuration, the first and second relay terminals can be used as common parts. This can prevent the mix-up of the first and second relay terminals and is advantageous in terms of parts management.

According to the present invention, it is possible to reduce man-hours for constructing a relay circuit and realize space saving of the relay circuit.

DETAILED DESCRIPTION

One embodiment of the present invention is described with reference to FIGS. 1 to 20.

This embodiment concerns a vehicle-side connector 10 to be connected to a battery (not shown) mounted in a vehicle, and the battery is charged by properly connecting a charging connector 90 connected to a power supply to this vehicle-side connector 10 and applying power.

Note that, in the following description, a vertical direction is based on a vertical direction in FIG. 2. Further, a front-back direction is based on a lateral direction in FIG. 2 and sides of the two connectors 10, 90 to be connected to each other are referred to as front sides on the basis of a connecting direction of the connectors 10, 90.

Figure 20:
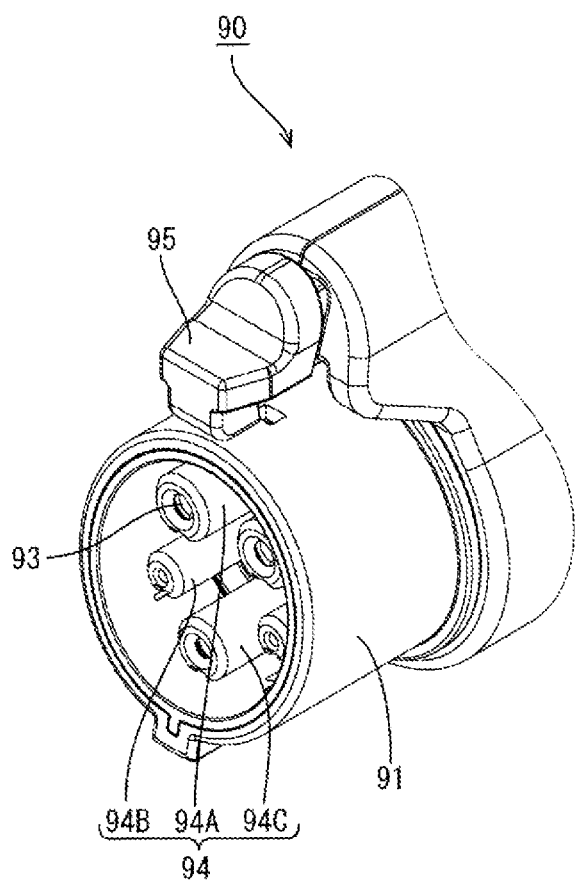
FIG. 20 is a perspective view of a charging connector.

As shown in FIG. 20, the charging connector 90 is provided with a hollow cylindrical charging-side fitting portion 91 fittable into the vehicle-side connector 10. Terminal accommodating tube portions 94 in which charging terminals 93 are individually accommodated are formed in three upper, middle and lower rows inside the charging-side fitting portion 91, wherein two in the upper row are power supply terminal accommodating tube portions 94A, two in the middle row are signal terminal accommodating tube portions 94B and one in the center of the lower row is a ground terminal accommodating tube portion 94C.

Figure 5:
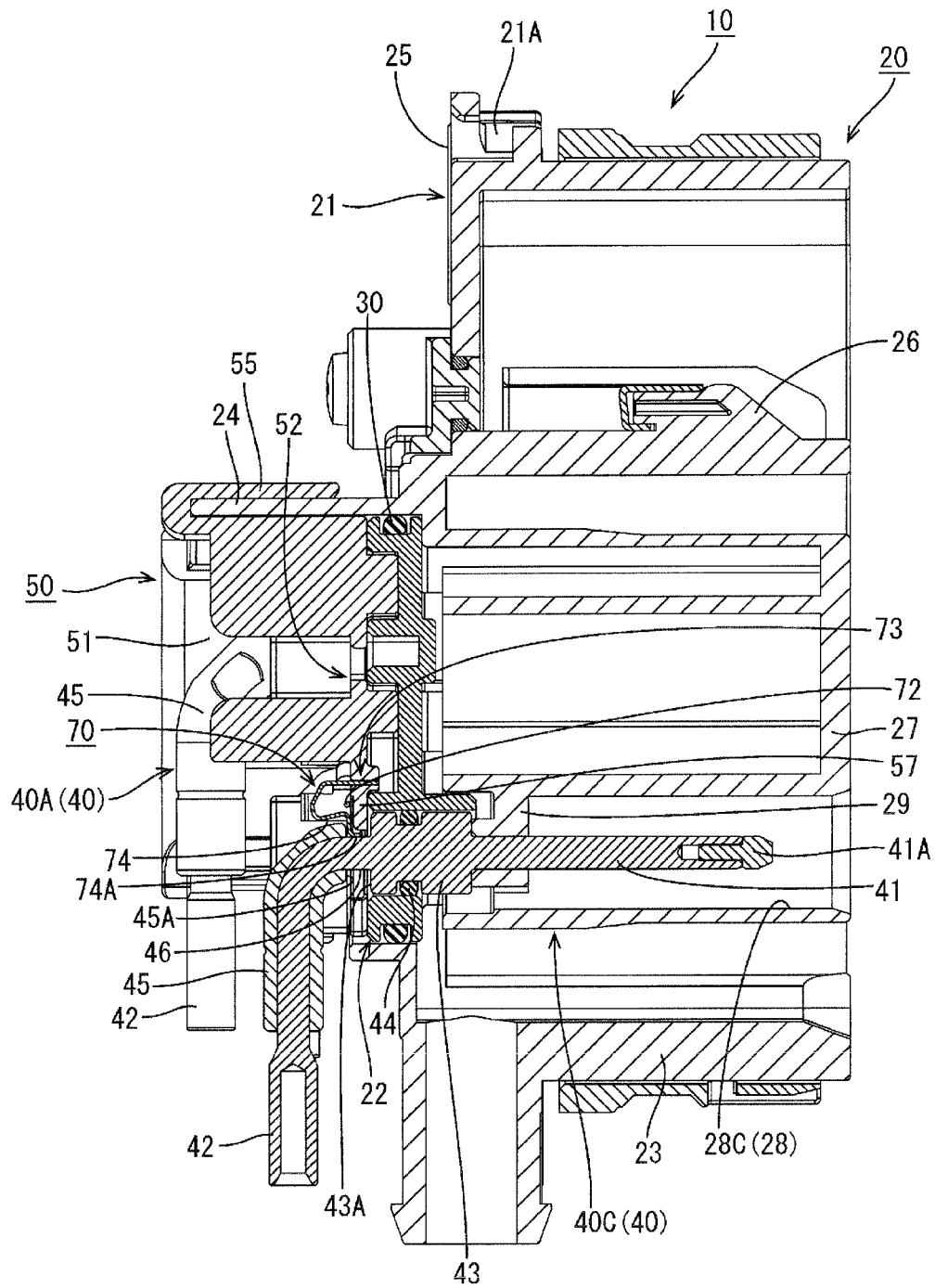
FIG. 5 is a section of the vehicle-side connector cut along B-B of FIG. 3.
Figure 7:
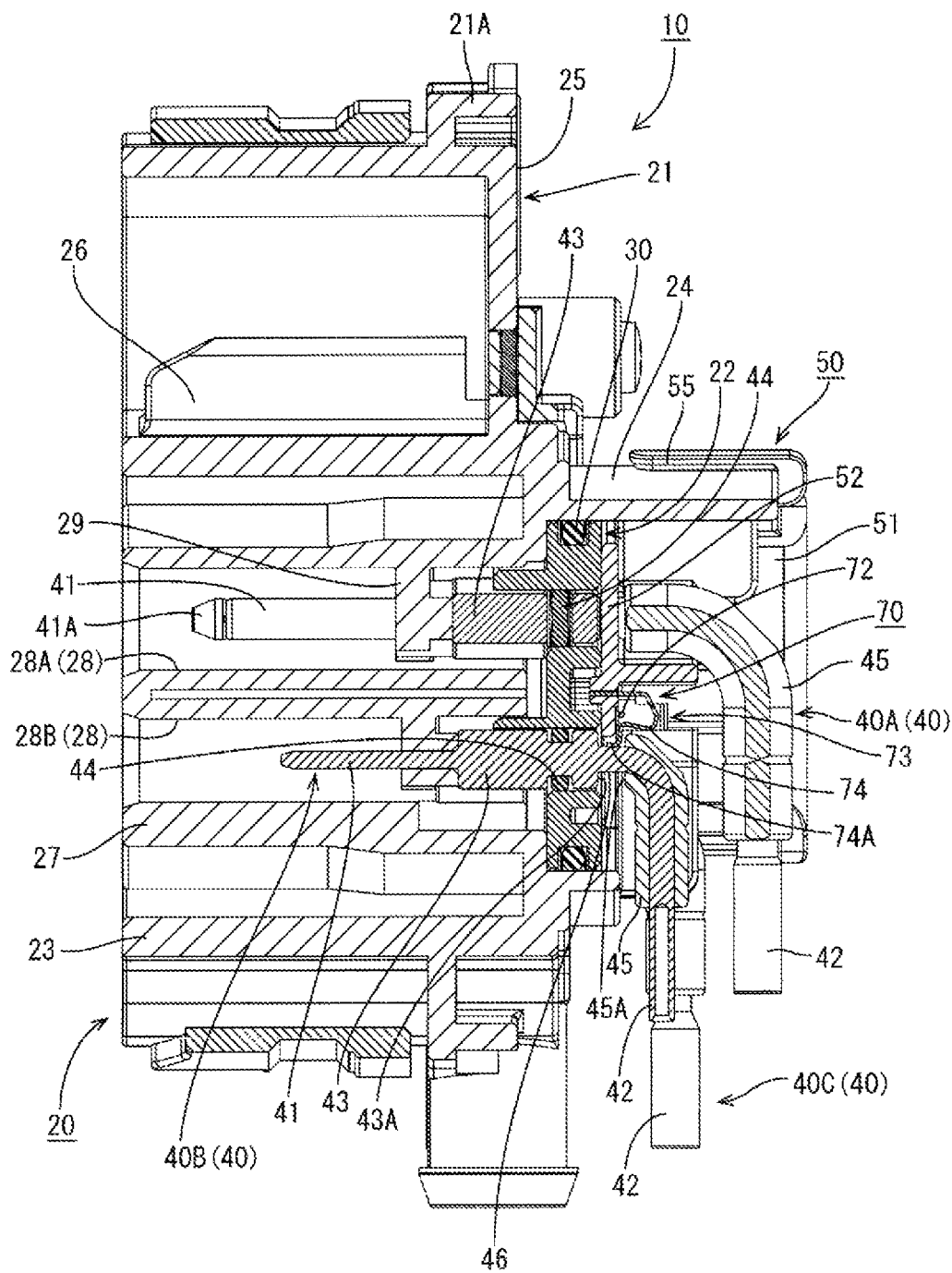
FIG. 7 is a section of the vehicle-side connector cut along C-C of FIG. 3.
Figure 8:
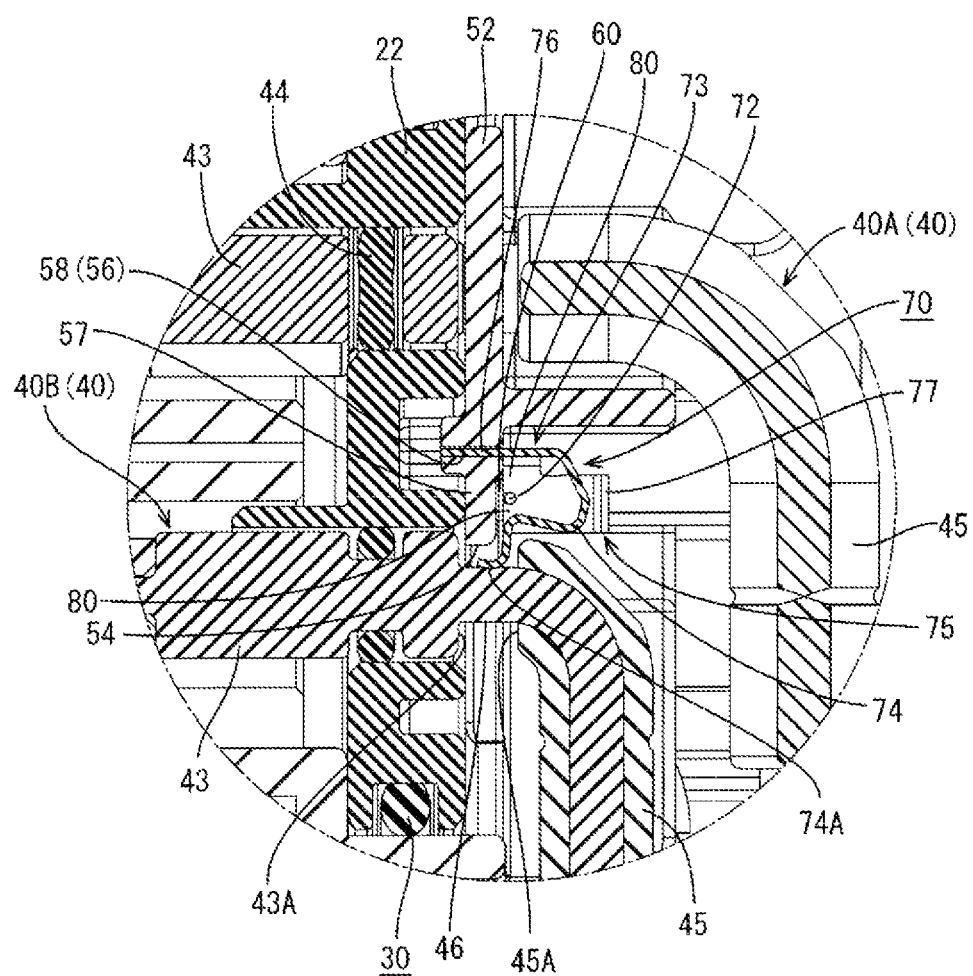
FIG. 8 is an enlarged section of an essential part of FIG. 7.

As shown in FIGS. 5 and 7, the vehicle-side connector 10 includes a housing 20 made of synthetic resin, a plurality of vehicle-side terminals 40 accommodated in the housing 20 and a retainer 50 for collectively retaining the plurality of vehicle-side terminals 40.

Figure 3:
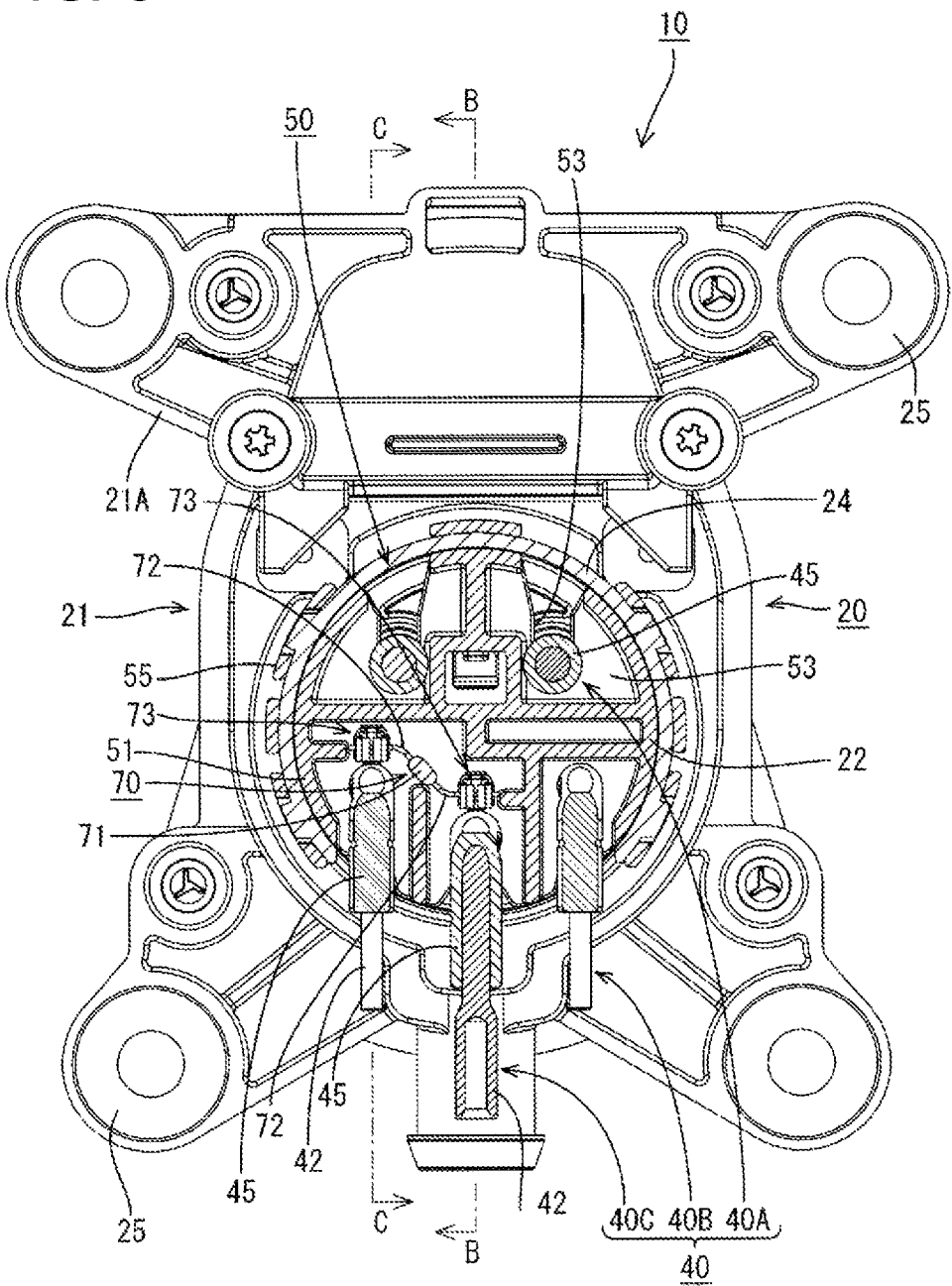
FIG. 3 is a section along A-A of FIG. 2.
Figure 4:
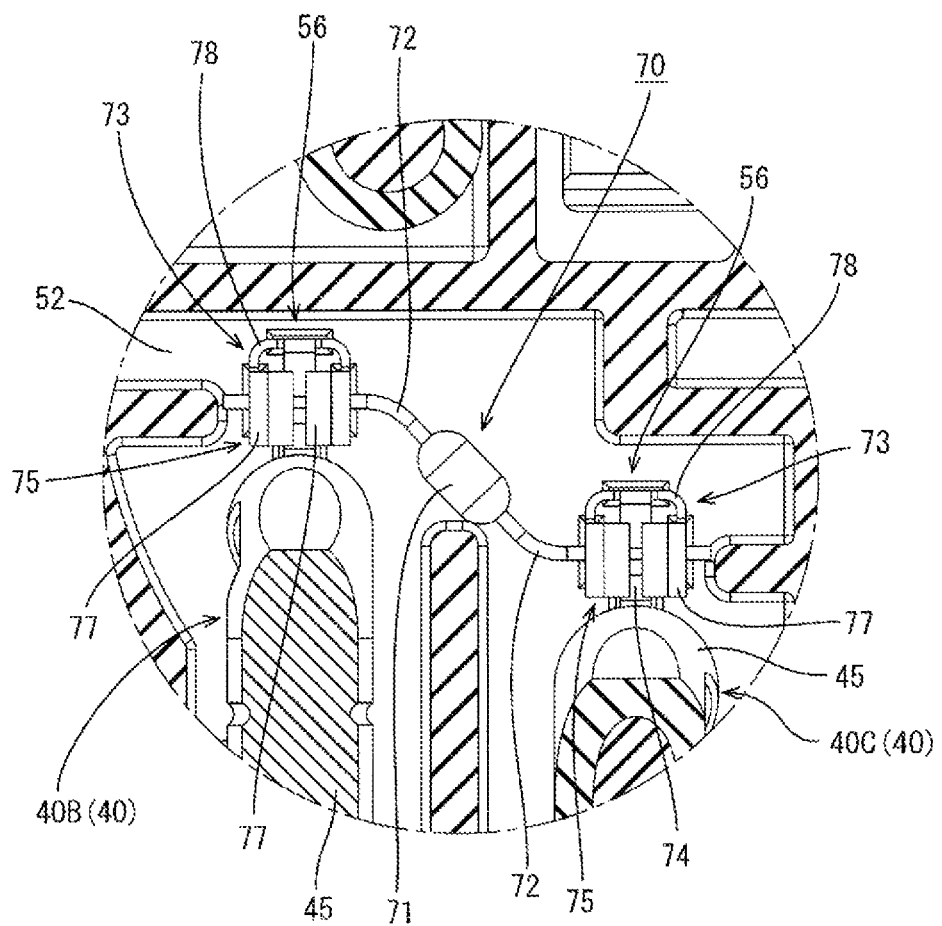
FIG. 4 is an enlarged section of an essential part of FIG. 3.

As shown in FIGS. 5 and 7, the vehicle-side terminals 40 are roughly in the form of long and narrow round pins and composed of a pair of vehicle-side power supply terminals 40A to be respectively connected to a pair of power supply lines (not shown), a pair of vehicle-side signal terminals 40B to be respectively connected to a pair of signal lines (not shown) and a vehicle-side ground terminal 40C to be connected to a ground line (not shown) as shown in FIG. 3. Further, the vehicle-side terminals 40 are formed to have a smaller diameter in the order of the vehicle-side power supply terminals 40A, the vehicle-side ground terminal 40C and the vehicle-side signal terminals 40B while having substantially the same shape, and have the same basic configuration.

The vehicle-side terminal 40 is formed by applying heading, cutting and the like to a round metal bar as a base material and provided with a pin-like connecting portion 41 to be connected to the charging terminal 93 of the charging connector 90 on one end side and a tubular wire connecting portion 42 to be crimped to a core of an unillustrated wire on the other end side.

The pin-like connecting portion 41 is inserted into the corresponding terminal accommodating tube portion 94 of the charging connector 90 to be electrically connected to the charging terminal 93 when the vehicle-side connector 10 and the charging connector 90 are connected. Further, protection caps 41A are mounted on the tips of some of the pin-like connecting portions 41, and a cylindrical main body portion 43 having a rubber ring 44 fitted thereon is formed on a rear end part of each pin-like connecting portion 41 while having a larger diameter than the pin-like connecting portion 41.

Further, an insulating tube portion 45 made of synthetic resin is formed by molding over a range from a part bent at a right angle to a position before the wire connecting portion 42. A front surface 45A of this insulating tube portion 45 is formed at a position at a distance from a rear surface 43A of the main body portion 43 to face the rear surface 43A, and a locked groove 46 is formed between the front surface 45A of the insulating tube portion 45 and the rear surface 43A of the main body portion 43.

As shown in FIGS. 5 and 7, the housing 20 is formed by combining a housing main body 21 into which the charging-side fitting portion 91 of the charging connector 90 is to be fitted and a disc-like sub-housing 22 to be fitted to the housing main body 21 from behind in the front-back direction.

Figure 1:
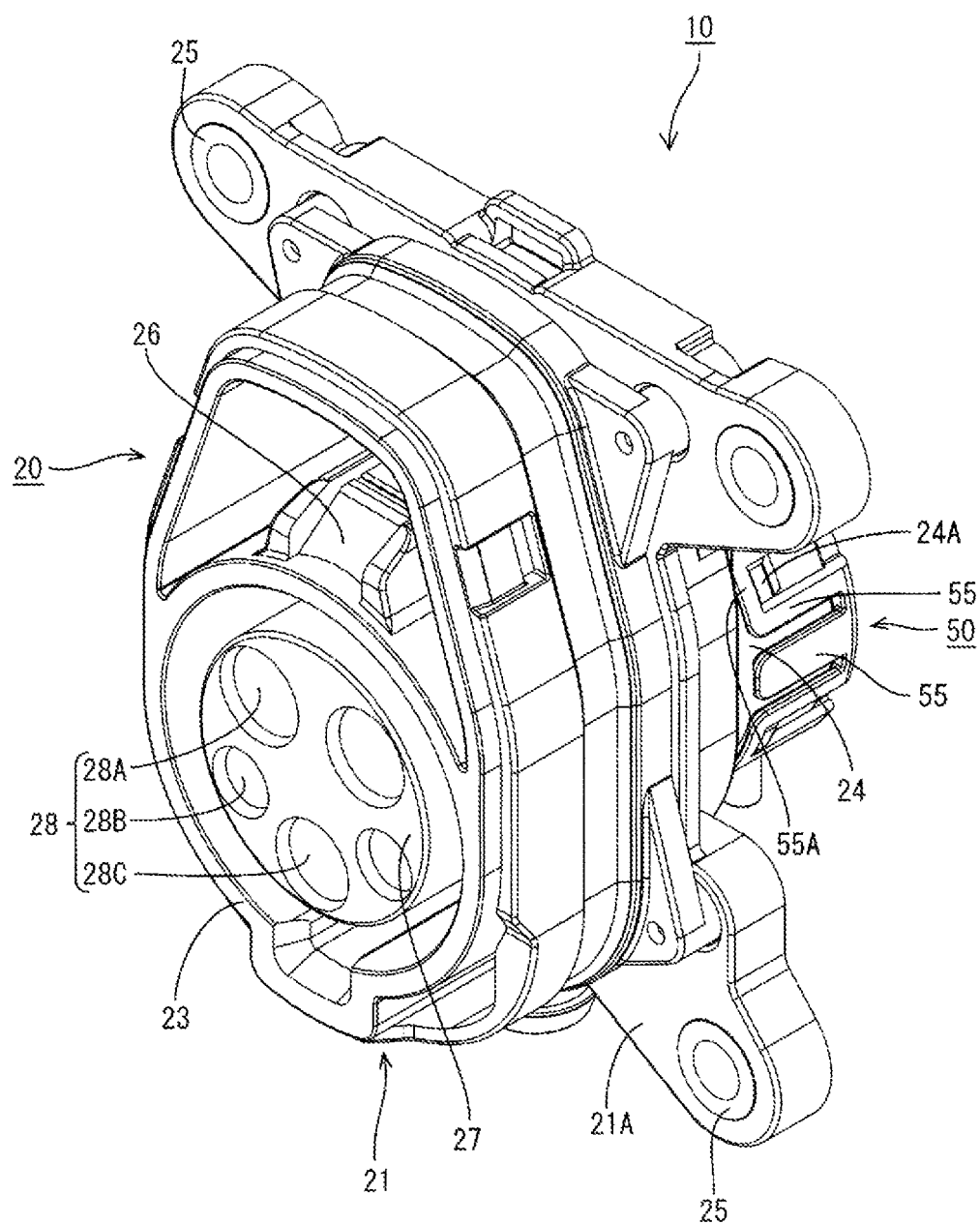
FIG. 1 is a perspective view of a vehicle-side connector.
Figure 2:
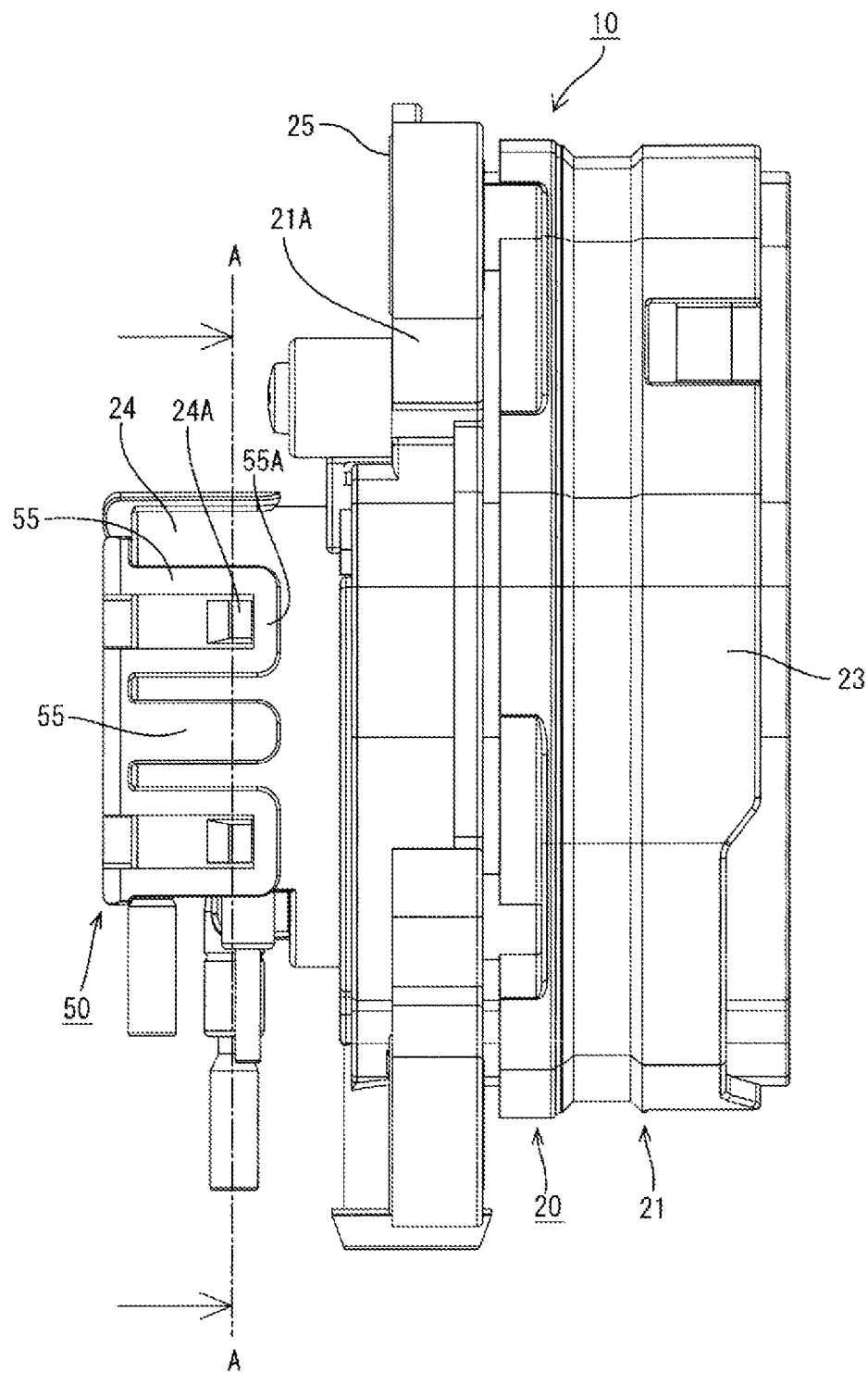
FIG. 2 is a side view of the vehicle-side connector.

As shown in FIGS. 1 and 2, the housing main body 21 is provided with a substantially hollow cylindrical connector fitting portion 23, into which the charging-side fitting portion 91 is to be fitted, on the front surface of a mounting plate 21A to be fixed to a body (not shown) of a vehicle and a substantially hollow cylindrical fitting tube portion 24, into which the sub-housing 22 is to be fitted, on the rear surface of the mounting plate 21A.

A plurality of (four in this embodiment) collars 25 are embedded in the mounting plate 21A, and the housing 20 is fixed to the body of the vehicle by inserting bolts (not shown) into these collars 25 and tightening them into the body of the vehicle.

As shown in FIG. 1, a lock portion 26 to which a lock claw 95 (see FIG. 20) provided on the charging connector 90 is locked when the connector fitting portion 23 and the charging-side fitting portion 91 are properly fitted is provided atop the connector fitting portion 23. The lock claw 95 and the lock portion 26 are locked to each other to hold the charging connector 90 and the vehicle-side connector 10 in a connected state.

As shown in FIGS. 1, 5 and 7, a cylindrical terminal accommodating portion 27 connected in the front-back direction to the sub-housing 22 to be fitted into the fitting tube portion 24 is provided in the connector fitting portion 23, and a plurality of cavities 28 common to the terminal accommodating portion 27 and the sub-housing 22 and in the form of round holes are provided to penetrate through the terminal accommodating portion 27 and the sub-housing 22 in the front-back direction.

As shown in FIG. 1, the plurality of cavities 28 are arranged in three upper, middle and lower rows, wherein a pair of cavities 28 arranged in the upper row are a pair of power supply cavities 28A for accommodating the vehicle-side power supply terminals 40A, a pair of cavities 28 arranged in the middle row are a pair of signal cavities 28B for accommodating the vehicle-side signal terminals 40B and the cavity 28 arranged in the center of the lower row is a ground cavity 28C for accommodating the vehicle-side ground terminal 40C. The corresponding vehicle-side terminal 40 is individually insertable into each cavity 28 from behind and accommodated over the housing main body 21 and the sub-housing 22 as shown in FIGS. 5 and 7.

A front stop portion 29 for locking the main body portion 43 of the vehicle-side terminal 40 from front is provided in the cavity 28 of the terminal accommodating portion 27. When each vehicle-side terminal 40 is inserted to a proper position into the cavity 28, the main body portion 43 is locked from front by the front stop portion 29 and the pin-like connecting portion 41 projects from the front stop portion 29.

As shown in FIGS. 5 to 8, the main body portion 43 of the corresponding vehicle-side terminal 40 is accommodated into the sub-housing 22 and the rubber ring 44 fitted on the main body portion 43 is held in close contact with the outer peripheral surface of the main body portion 43 and the inner peripheral surface of the cavity 28, thereby providing sealing between the both. Further, a seal ring 31 is fitted on the outer peripheral surface of the sub-housing 22. The seal ring 31 is held in close contact with the inner peripheral surface of the fitting tube portion 24 and the outer peripheral surface of the sub-housing 22 to provide sealing between the both when the sub-housing 22 is fitted into the fitting tube portion 24 of the housing main body 21.

Figure 9:
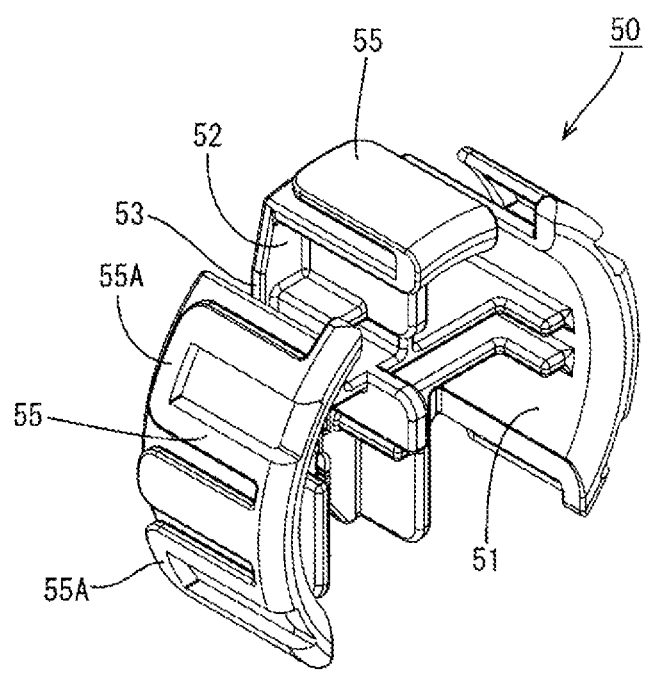
FIG. 9 is a perspective view of a retainer.
Figure 10:
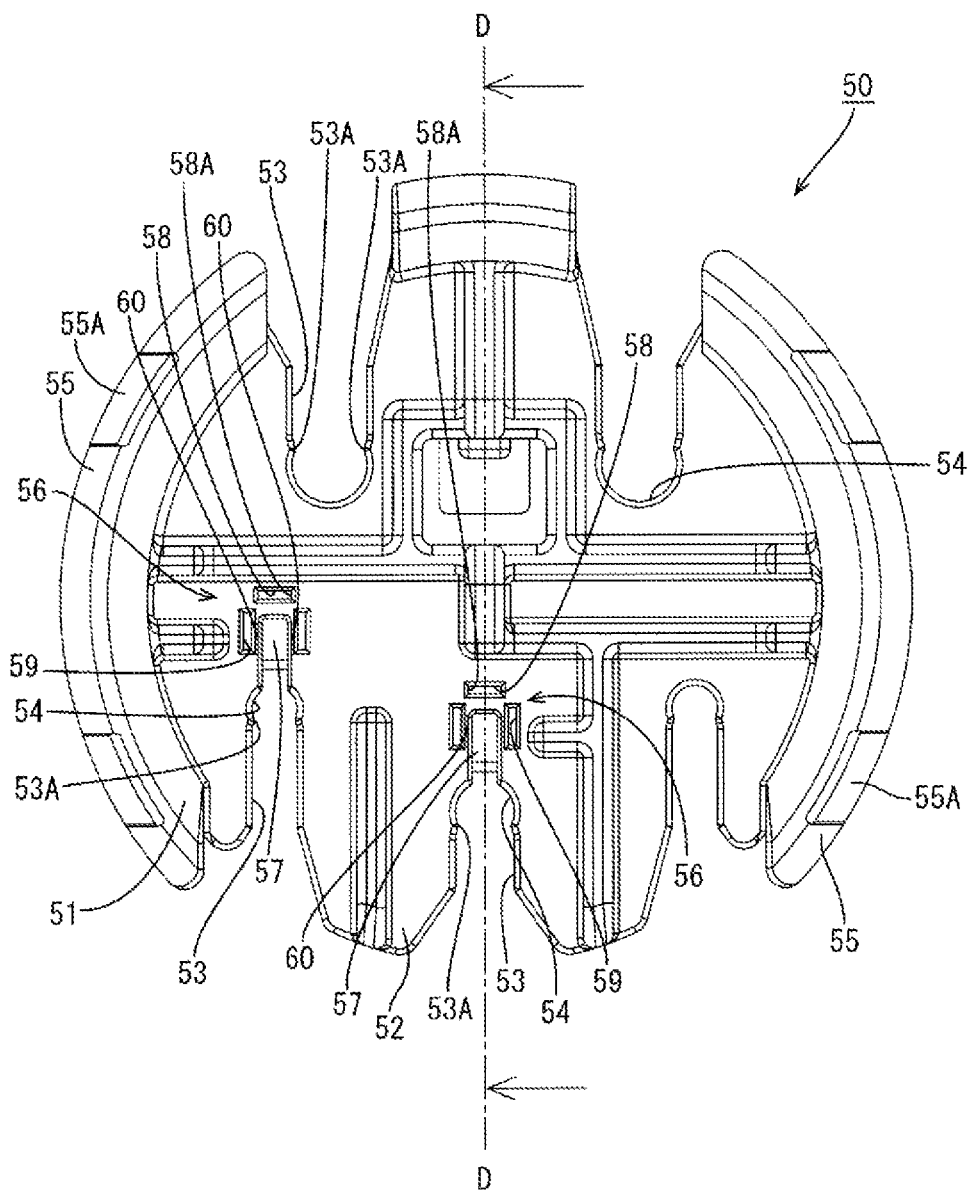
FIG. 10 is a rear view of the retainer.
Figure 11:
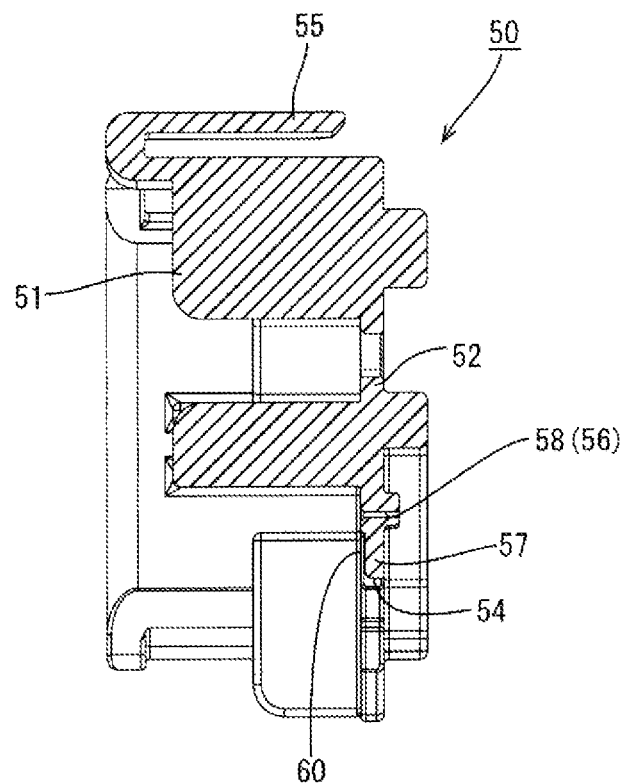
FIG. 11 is a section along D-D of FIG. 10.

The retainer 50 is made of synthetic resin and mountable onto the housing 20 from behind as shown in FIGS. 2, 5 and 7. As shown in FIGS. 9 to 11, this retainer 50 includes a substantially hollow cylindrical retainer main body 51 with a front surface plate 52 and this retainer main body 51 is fittable behind the sub-housing 22 in the fitting tube portion 24 of the housing main body 21.

As shown in FIG. 10, the front surface plate 52 of the retainer main body 51 is provided with a plurality of (five in this embodiment) insertion paths 53 into which the locked grooves 46 of the respective vehicle-side terminals 40 are radially insertable. These insertion paths 53 are formed by being vertically cut to be open on the peripheral edge of the front surface plate 52, a pair of insertion paths 53 open on the upper edge of the front surface plate 52 are provided in an upper part of the front surface plate 52, and the locked groves 46 of the vehicle-side power supply terminals 40A are tightly insertable into these insertion paths 53. Further, three insertion paths 53 open on the lower edge of the front surface plate 52 are provided side by side in the lateral direction in a lower part of the front surface plate 52. The locked groove 46 of the vehicle-side ground terminal 40C is tightly insertable into the middle insertion path 53 out of the three insertion paths 53 and the locked grooves 46 of the vehicle-side signal terminals 40B are tightly insertable into the insertion paths 53 on opposite left and right sides.

A substantially arcuate holding groove 54 into which the locked groove 46 of the vehicle-side terminal 40 is fittable is provided on the back end of each insertion path 53, and each holding groove 54 is arranged concentrically with the cavity 28 of the housing 20 as shown in FIG. 3. Further, as shown in FIG. 10, a pair of locking projections 53A slightly projecting from opposite side edges of the insertion path 53 to face each other are provided near the entrance of the holding groove 54, and the locked groove 46 of the vehicle-side terminal 40 can pass between the pair of locking projections 53A while being somewhat press-fitted. Thus, when the locked groove 46 of the vehicle-side terminal 40 is fitted into the holding groove 54, the locked groove 46 of the vehicle-side terminal 40 is retained in the holding groove 54 by the pair of locking projections 53A and the front surface (rear surface 43A of the main body portion 43) and the rear surface (front surface 45A of the insulating tube portion 45) of the locked groove 46 are locked in the front-back direction by the holding groove 54.

As shown in FIGS. 2 and 5, a plurality of mounting pieces 55 arranged along the outer peripheral surface of the fitting tube portion 24 of the housing main body 21 are resiliently deformably provided on an outer side of a peripheral wall of the retainer main body 51 while being folded forward from the rear edge of the retainer main body 51. Lock portions 55A capable of individually locking a plurality of locked portions 24A provided on the outer peripheral surface of the fitting tube portion 24 are provided on some of the mounting pieces 55 and the retainer 50 is held on the housing 20 by locking the locked portions 24A and the lock portion 55A in the front-back direction as shown in FIG. 2. That is, by holding the retainer 50 on the housing 20, the vehicle-side terminals 40 accommodated in the cavities 28 are held while being prevented from coming out backward.

As shown in FIGS. 10 to 14, the front surface plate 52 of the retainer main body 51 is provided with a pair of mounting recesses 56 into which a resistance circuit unit (corresponding to a "relay circuit unit") is assembled from behind.

Figure 16:
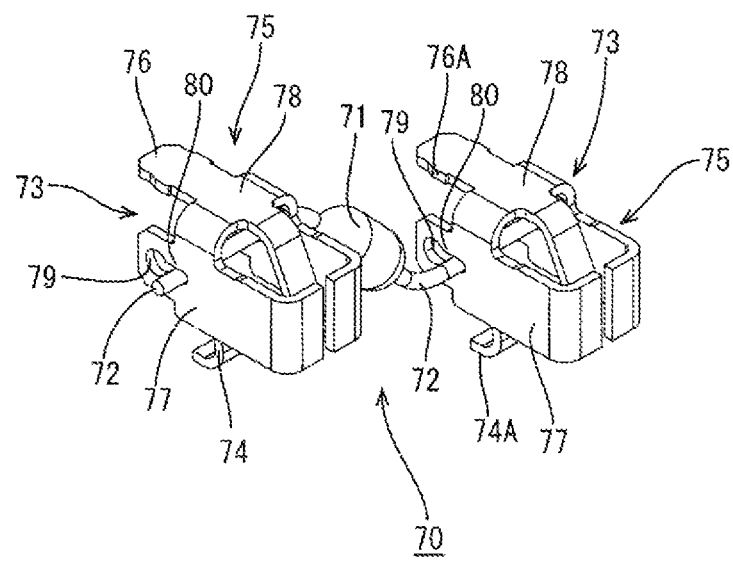
FIG. 16 is a perspective view showing a state after the relay terminals and the resistor are connected.
Figure 17:
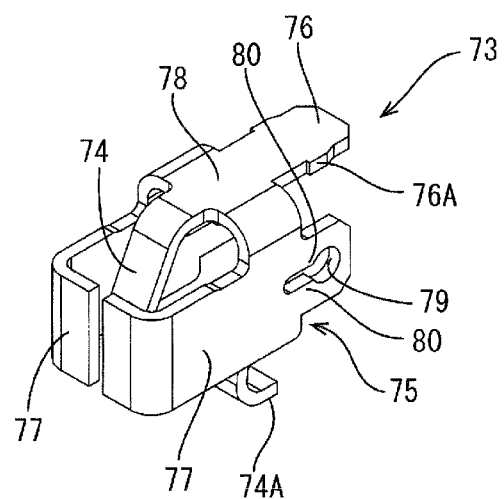
FIG. 17 is a perspective view of the relay terminal.

The resistance circuit unit 70 is mounted before the vehicle-side terminals 40 are mounted into the retainer 50 and includes, as shown in FIGS. 16 and 17, a substantially hollow cylindrical resistor (corresponding to an "electronic component") 71 with a pair of leads 72 provided on opposite end parts, and a pair of relay terminals 73 arranged on opposite left and right sides of the resistor 71 and respectively connected to the leads 72 of the resistor 71. Note that, in this embodiment, the relay terminal 73 arranged on the right side of the resistor 71 corresponds to a first relay terminal and the relay terminal 73 arranged on the left side of the resistor 71 corresponds to a second relay terminal.

Figure 15:
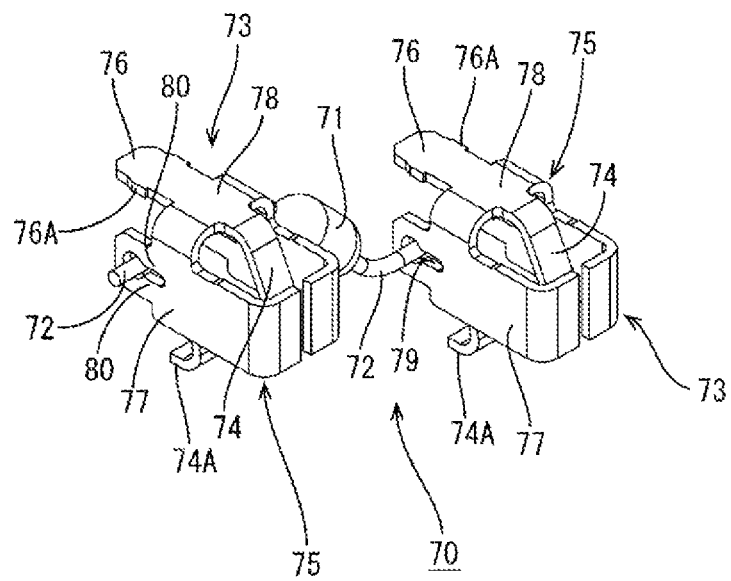
FIG. 15 is a perspective view showing a state before relay terminals and a resistor are connected.

As shown in FIGS. 15 and 16, the pair of relay terminals 73 are identically shaped and each includes a resiliently displaceable terminal connecting portion 74 to be connected to the vehicle-side terminal 40, a lead connecting portion 75 to be connected to the lead 72 and a press-fit piece (corresponding to a "press-fit portion") to be press-fitted into the retainer main body 51.

Figure 18:
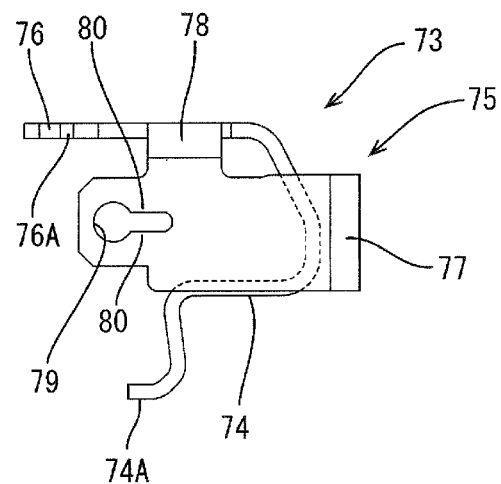
FIG. 18 is a side view of the relay terminal.
Figure 19:
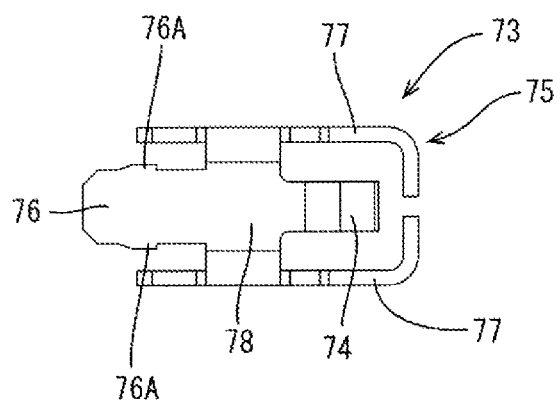
FIG. 19 is a plan view of the relay terminal.

As shown in FIGS. 17 to 19, the lead connecting portion 75 is formed by coupling parts of the upper end edges of a pair of connecting pieces 77 facing each other in the lateral direction by an inverted U-shaped coupling portion 78, and lead insertion holes 79 through which the lead 72 is successively inserted are respectively provided on front parts of the connecting pieces 77.

As shown in FIG. 18, a front part of the lead insertion hole 79 is larger than an outer diameter of the lead 72 and a rear part thereof is smaller than the outer diameter of the lead 72 and a pair of pressure contact blades 80 vertically facing each other are provided on a rear opening edge of the lead insertion hole 79. Thus, the lead 72 of the resistor 71 is inserted through the front parts of the both lead insertion holes 79 of each relay terminal 73 as shown in FIG. 15 and pushed into between the pressure contact blades 80 as shown in FIG. 16, whereby each lead 72 is brought into pressure contact with the pair of connecting pieces 77 of each relay terminal 73 to be electrically connected. That is, the pair of relay terminals 73 are connected via the resistor 71 to construct the resistance circuit unit 70 by connecting the pair of leads 72 of the resistor 71 to the respective connecting pieces 77.

As shown in FIGS. 17 to 19, rear parts of the pair of connecting pieces 77 extend further backward than the coupling portion 78 and end parts thereof are bent to face each other and arranged to cover lateral and rear sides of the terminal connecting portion 74 provided on the rear end of the coupling portion 78. In this way, the damage of the terminal connecting portion 74 due to the contact of another member with the terminal connecting portion 74 is prevented.

As shown in FIG. 18, the terminal connecting portion 74 extends obliquely downward toward a rear side after slightly extending backward from a central part of the rear edge of the coupling portion 78 of the lead connecting portion 75. The terminal connecting portion 74 is folded forward after a rear end part thereof extends up to substantially the same height position as lower end parts of the connecting pieces 77, and bent downwardly at a position where a front end part thereof is substantially aligned with the rear end positions of the lead insertion holes 79 of the connecting pieces 77. That is, the terminal connecting portion 74 is folded in the front-back direction while extending downward, and a tip part (lower end part) of the terminal connecting portion 74 is vertically resiliently displaceable by a resilient displacement of the entire terminal connecting portion 74.

Further, the tip part of the terminal connecting portion 74 is bent forward and the lower surface of the tip part of the terminal connecting portion 74 serves as a contact portion 74A to be vertically brought into contact with the vehicle-side terminal 40.

As shown in FIG. 19, the press-fit piece 76 is in the form of a flat plate extending forward from a central part of the front edge of the coupling portion 78 of the lead connecting portion 75, and press-fit projections 76A projecting outward are respectively provided on opposite side edges of the press-fit piece 76.

On the other hand, as shown in FIG. 10, the pair of mounting recesses 56 of the retainer main body 51 are arranged at positions above the holding groove 54 into which the locked groove 46 of the vehicle-side signal terminal 40B arranged on the left side is to be fitted and above the holding groove 54 into which the locked groove 46 of the vehicle-side ground terminal 40C is to be fitted, and each mounting recess 56 is provided to surround a thinned portion 57 extending upward from an upper edge part of the corresponding holding groove 54. Further, each mounting recess 56 is composed of a press-fit recess 58 which is located above the thinned portion 57 and into which the press-fit piece 76 of the relay terminal 73 is to be press-fitted from behind and a pair of fitting recesses 59 which are located at opposite left and right sides of the thinned portion 57 and into which the pair of connecting pieces 77 are to be respectively fitted from behind.

Figure 12:
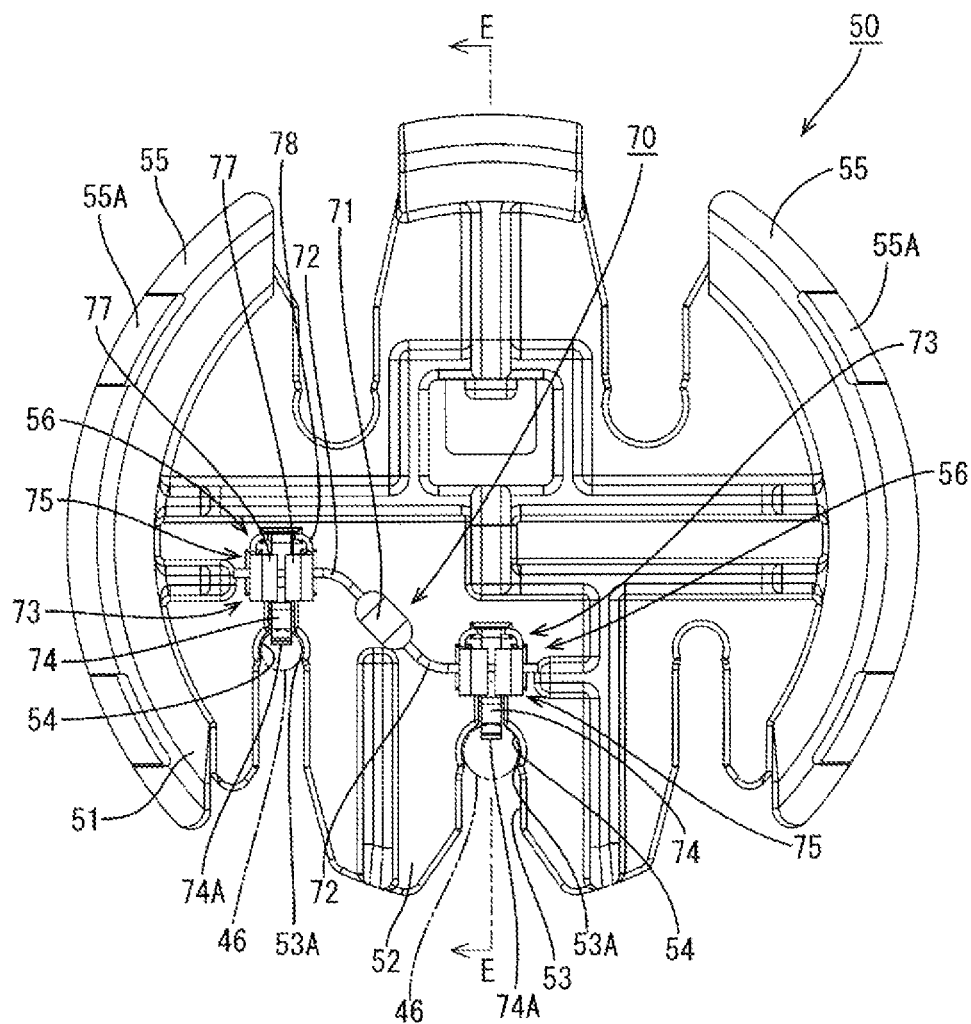
FIG. 12 is a rear view showing a state where a resistance circuit unit is mounted in the retainer.
Figure 13:
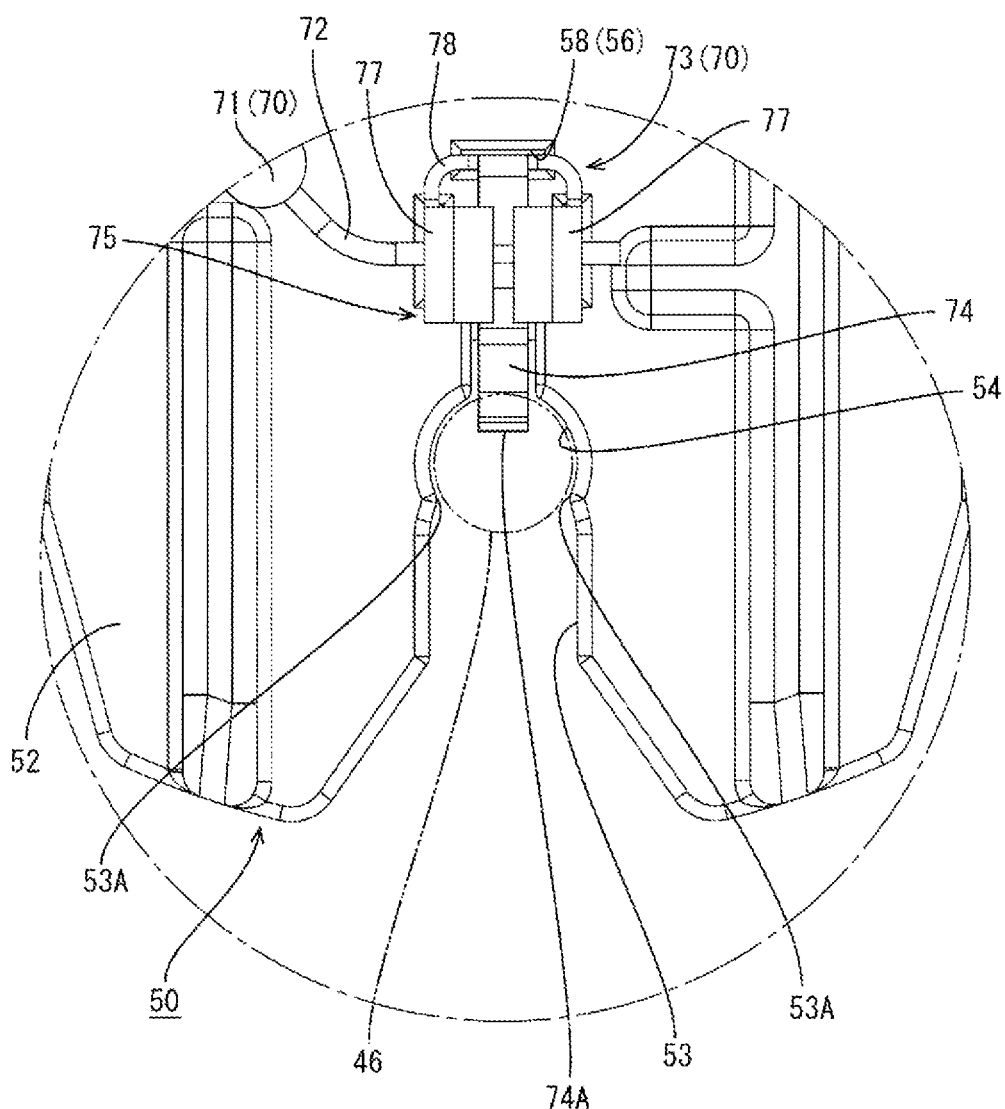
FIG. 13 is an enlarged section of an essential part of FIG. 12.
Figure 14:
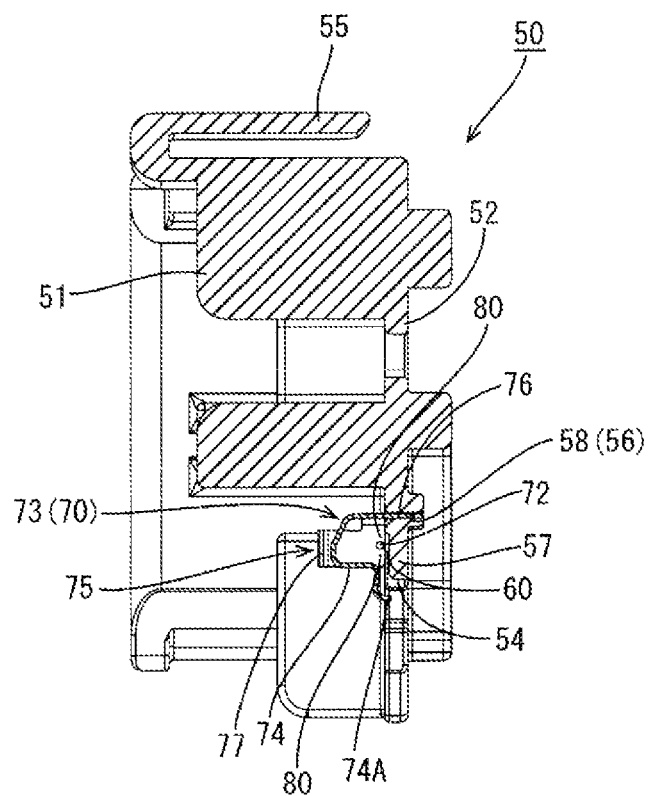
FIG. 14 is a section along E-E of FIG. 12.

As shown in FIGS. 12 to 14, the press-fit recess 58 is so set that the press-fit piece 76 is completely inserted thereinto and it can be confirmed that the press-fit piece 76 has been inserted to a proper position by the contact of the front end surface of the coupling portion 78 with an outer peripheral edge part of the press-fit recess 58. Further, when about the half of the press-fit piece 76 is inserted into the press-fit recess 58, the front end parts of the connecting pieces 77 of the lead connecting portion 75 are fitted into the fitting recesses 59. When the press-fit piece 76 is inserted to the proper position into the press-fit recess 58, the connecting pieces 77 are inserted up to front end parts of the pressure contact blades 80.

Further, the press-fit projections 76A of the press-fit piece 76 can be press-fitted into between left and right inner walls 58A of the press-fit recess 58. When the press-fit piece 76 of the relay terminal 73 is inserted to the proper position into the press-fit recess 58, the press-fit projections 76A are press-fitted into between the inner walls 58A of the press-fit recess 58 and the resistance circuit unit 70 is held in the sub-housing 22.

As shown in FIG. 10, pressing portions 60 projecting further backward than the fitting recesses 59 and the thinned portion 57 are provided between the pair of fitting recesses 59 and the thinned portion 57. These pressing portions 60 come into contact with the lead 72 arranged between the lead insertion holes 79 of the connecting pieces 77 from front when the front end parts of the corresponding connecting pieces 77 are lightly fitted into the pair of fitting recesses 59. When the connecting pieces 77 are further fitted into the fitting recesses 59, the pressing portions 60 press the lead 72 from front and the lead 72 is pushed into between the pressure contact blades 80 of the lead connecting portion 75 as shown in FIGS. 5 to 8. Specifically, the lead 72 of the resistor 71 and the lead connecting portion 75 of the relay terminal 73 can be electrically connected only by mounting the relay terminal 73 into the mounting recess 56 from behind.

Figure 6:
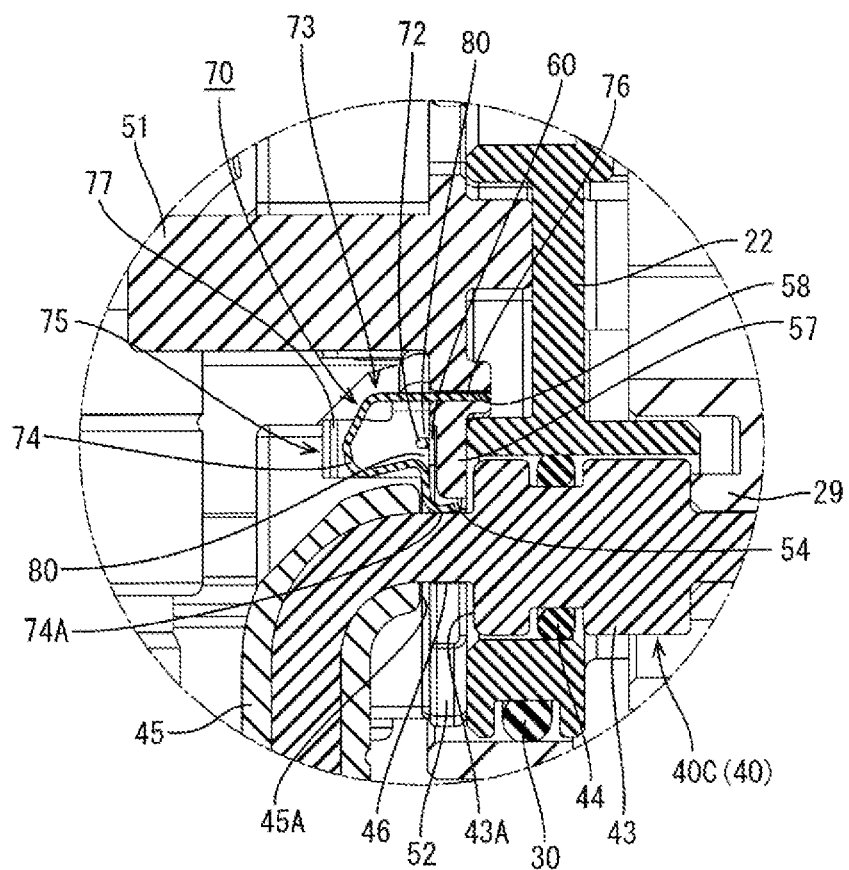
FIG. 6 is an enlarged section of an essential part of FIG. 5.

When the relay terminals 73 are mounted into the mounting recesses 56, the tips of the terminal connecting portions 74 (contact portions 74A of the terminal connecting portions 74) of the relay terminals 73 are set to project into the holding grooves 54 of the retainer main body 51 as shown in FIGS. 12 and 13. Thus, when the locked grooves 46 of the vehicle-side terminals 40 pass in the insertion paths 53 and are fitted and held in the holding grooves 54 of the retainer main body 51 after the resistance circuit unit 70 is mounted into the retainer main body 51, the locked grooves 46 of the vehicle-side terminals 40 are pressed against the contact portions 74A of the terminal connecting portions 74 in the relay terminals 73 from below and the contact portions 74A of the terminal connecting portions 74 are resiliently held in contact with the locked grooves 46 as shown in FIGS. 5 to 7. In this way, the left relay terminal 73 of the resistance circuit unit 70 and the vehicle-side signal terminal 40B are electrically connected and the right relay terminal 73 of the resistance circuit unit 70 and the vehicle-side ground terminal 40C are electrically connected.

Specifically, the vehicle-side signal terminal 40B and the vehicle-side ground terminal 40C can be electrically connected via the resistance circuit unit 70 by inserting the vehicle-side signal terminal 40B and the vehicle-side ground terminal 40C into the holding groove 54 of the retainer main body 51.

The vehicle-side connector 10 of this embodiment is configured as described above. Next, an example of an assembling procedure of the vehicle-side connector 10 is briefly described and functions and effects of the vehicle-side connector 10 are described.

First, the retainer 50 and the resistance circuit unit 70 are prepared. Note that the resistance circuit unit 70 in this stage is temporarily assembled by inserting the leads 72 of the resistor 71 into the front parts of the lead insertion holes 79 of the connecting pieces 77 instead of connecting the leads 72 to the connecting pieces 77 in the lead connecting portions 75 of the relay terminals 73 as shown in FIG. 15.

Subsequently, the temporarily assembled resistance circuit unit 70 is mounted into the pair of mounting recesses 56 of the retainer main body 51 from behind. Specifically, the press-fit pieces 76 of the relay terminals 73 are first inserted into the press-fitting recesses 58. When about the halves of the press-fit pieces 76 are inserted into the press-fitting recesses 58, the front end parts of the connecting pieces 77 of the lead connecting portions 75 are lightly fitted into the fitting recesses 59 and the pressing portions 60 come into contact with the leads 72 arranged between the lead insertion holes 79 of the connecting pieces 77 from front. When the connecting pieces 77 continue to be fitted into the fitting recesses 59, the leads 72 are pressed forward by the pressing portions 60 and pushed into between the pressure contact blades 80 of the lead connecting portions 75, whereby the leads 72 and the lead connecting portions 75 are electrically connected. That is, only by mounting the resistance circuit unit 70 into the pair of fitting recesses 56 from behind, the leads 72 of the resistor 71 and the lead connecting portions 75 of the relay terminals 73 are electrically connected and the resistance circuit unit 70 in which the pair of relay terminals 73 are electrically connected to the resistor 71 can be constructed.

When the press-fit pieces 76 of the relay terminals 73 are inserted to the proper positions into the press-fitting recesses 58, the press-fit projections 76A are press-fitted into between the inner walls 58A of the press-fitting recesses 58 and the resistance circuit unit 70 is held in the sub-housing 22. At this time, the contact portion 74A of the terminal connecting portion 74 of each relay terminal 73 is projecting into the corresponding holding groove 54 of the retainer main body 51.

Subsequently, the locked groove 46 of the corresponding vehicle-side terminal 40 is vertically inserted into each insertion path 53 of the retainer 50 mounted with the resistance circuit unit 70 and fitted into the holding groove 54. When being fitted into the holding groove 54, the locked groove 46 is retained by the pair of locking projections 53A. Further, the front surface (rear surface 43A of the main body portion 43) and the rear surface (front surface 45A of the insulating tube portion 45) of the locked groove 46 are locked in the front-back direction by the holding groove 54. Here, when the locked groove 46 of the vehicle-side signal terminal 40B is fitted into the holding groove 54 arranged in a left lower part and that of the vehicle-side ground terminal 40C is inserted into the holding groove 54 arranged in a central lower part, the locked grooves 46 of the vehicle-side terminals 40 are resiliently held in contact with the contact portions 74A of the terminal connecting portions 74 in the relay terminals 73 as shown in FIGS. 5 to 7. In this way, the left relay terminal 73 of the resistance circuit unit 70 and the vehicle-side signal terminal 40B are electrically connected and the right relay terminal 73 of the resistance circuit unit 70 and the vehicle-side ground terminal 40C are electrically connected.

Subsequently, the retainer 50 holding each vehicle-side terminal 40 is mounted onto the sub-housing 22 from behind. Specifically, the pin-like connecting portion 41 of each vehicle-side terminal 40 held in the retainer 50 is inserted into the cavity 28 of the sub-housing 22 from behind until the front surface plate 52 of the retainer main body 51 is connected to the rear surface of the sub-housing 22. Then, the rubber ring 44 fitted on the main body portion 43 of each vehicle-side terminal 40 is held in close contact with the inner peripheral surface of the corresponding cavity 28 and the sub-housing 22 and the retainer 50 are integrally assembled by a resulting frictional force.

Subsequently, the sub-housing 22 assembled with the retainer 50 is fitted into the fitting tube portion 24 of the housing main body 21 from behind. At this time, the pin-like connecting portion 41 of each vehicle-side terminal 40 is inserted into the corresponding cavity 28 provided in the terminal accommodating portion 27 of the housing main body 21 and the sub-housing 22 is fitting into the fitting tube portion 24 from behind. When the sub-housing 22 is inserted until each vehicle-side terminal 40 reaches the proper position, the seal ring 30 of the sub-housing 22 is held in close contact with the inner peripheral surface of the fitting tube portion 24 and the outer peripheral surface of the sub-housing 22 to seal between the both, and the main body portion 43 is locked from front by the front stop portion 29. At this time, the locked portions 24A and the lock portions 55A are locked in the front-back direction as shown in FIG. 2, whereby the retainer 50 is held on the housing 20. That is, by holding the retainer 50 on the housing 20, the vehicle-side terminals 40 accommodated in the cavities 28 are prevented from coming out backward and the vehicle-side connector 10 is completed.

As described above, according to the vehicle-side connector 10 of this embodiment, the leads 72 of the resistor 71 can come into pressure contact with the pressure contact blades 80 provided in the lead connecting portions 75 of the respective relay terminals 73 and the resistor 71 and the relay terminals 73 can be respectively electrically connected only by mounting the resistance circuit unit 70 into the pair of mounting recesses 56 of the retainer 50. Further, the locked groove 46 of each vehicle-side terminal 40 can be pressed against the contact portion 74A of the terminal connecting portion 74 of the relay terminal 73 from below and the vehicle-side signal terminal 40B and the vehicle-side ground terminal 40C can be respectively electrically connected to the relay terminals 73 only by fitting the vehicle-side signal terminal 40B into the holding groove 54 in the left lower part and fitting the vehicle-side ground terminal 40C into the holding groove 54 in the central lower part.

That is, the resistance circuit unit 70 can be easily provided between the vehicle-side signal terminal 40B and the vehicle-side ground terminal 40C as compared with the case where a resistance circuit is provided by soldering or crimping a resistor between wires drawn out from a vehicle-side connector. In this way, man-hours for constructing the resistance circuit can be drastically reduced as compared with the case where the resistance circuit is provided between the wires drawn out from the vehicle-side connector.

Further, according to this embodiment, the lead 72 and the connecting pieces 77 of the lead connecting portion 75 are electrically connected by bringing the lead 72 into pressure contact with the pairs of pressure contact blades 80. Thus, the structure of the lead connecting portion 75 can be simplified and miniaturized, for example, as compared with the case where the lead connecting portion is provided with a resilient contact piece or the like to be resiliently brought into contact with the lead.

In the case of a terminal connecting portion having a small vertical resilient displacement amount, a vehicle-side terminal cannot be firmly pressed against the terminal connecting portion and connection reliability between the vehicle-side terminal and the terminal connecting portion may be reduced if assembly tolerances between a retainer and vehicle-side terminals and between the retainer and a sub-housing and manufacturing tolerances of each part are large. In view of this, as a means to increase a vertical displacement amount of the terminal connecting portion, it is, for example, considered to ensure a large vertical displacement amount of the vertically resiliently displaceable terminal connecting portion by extending the terminal connecting portion long in the front-back direction while vertically extending the terminal connecting portion. However, in such a case, the terminal connecting portion becomes long in the front-back direction and the relay terminal is enlarged. However, according to this embodiment, the terminal connecting portion 74 is folded back in the front-back direction while being vertically extended. Thus, it is possible to ensure a large vertical displacement amount of the terminal connecting portion 74 while reducing a length of each relay terminal 73 in a press-fitting direction as compared with the case where the terminal connecting portion 74 is extended long in the front-back direction.

Further, according to this embodiment, the lateral and rear sides of the terminal connecting portion 74 to be resiliently held in contact with the locked groove 46 of the vehicle-side terminal 40 are covered by the rear part of the lead connecting portion 75. Thus, the damage of the terminal connecting portion due to the contact of another member or the like can be suppressed. That is, since the rear part of the lead connecting portion 75 is used also as a protection wall for protecting the terminal connecting portion 74 from damage, the structure of each relay terminal 73 can be simplified as compared with the case where the relay terminal is separately provided with a protection wall for protecting the terminal connecting portion.

Furthermore, according to this embodiment, the relay terminals 73 connected on the left and right sides of the resistor 71 are identically shaped, whereby the relay terminals 73 can be used as common parts. This can prevent the mix-up of the relay terminals 73 and is advantageous in terms of parts management as compared with the case where the relay terminals are differently shaped on the left and right sides.

The present invention is not limited to the above described and illustrated embodiment. For example, the following embodiments are also included in the technical scope of the present invention.

Although the housing 20 is composed of the housing main body 21 and the separate sub-housing 22 in the above embodiment, the present invention is not limited to such a mode. For example, the housing may include the integrally formed housing main body and sub-housing.

Although the vehicle-side signal terminal 40B arranged on the left side and the vehicle-side ground terminal 40C are connected by the resistance circuit unit 70 in the above embodiment, the present invention is not limited to such a mode. For example, the vehicle-side signal terminal arranged on the right side and the vehicle-side ground terminal may be connected by the resistance circuit unit.

Although the resistor 71 is used as an electronic component in the above embodiment, the present invention is not limited to such a mode. For example, a capacitor or a diode may be used as the electronic component.

Although the resistance circuit unit 70 is press-fitted into the front surface plate 52 of the retainer 50 in the above embodiment, the present invention is not limited to such a mode. For example, the front surface plate may be provided with an accommodating portion for accommodating the resistance circuit unit and the resistance circuit unit may be accommodated into that accommodating portion.

Although the relay terminals in the resistance circuit unit 70 are identically shaped on the left and right sides in the above embodiment, the present invention is not limited to such a mode. For example, relay terminals having different shapes may be used on the left and right sides.

LIST OF REFERENCE SIGNS

10: vehicle-side connector
20: housing
28: cavity
40: vehicle-side terminal
50: retainer 54: holding groove
70: resistance circuit unit (relay circuit unit)
71: resistor (electronic component)
72 lead
73: relay terminal (first relay terminal, second relay terminal)
75: lead connecting portion
74: terminal connecting portion
76: press-fit piece (press-fit portion)
80: pressure contact blade
90: charging connector
93: charging terminal

The invention claimed is:

1. A vehicle-side connector to be connected to a battery mounted in a vehicle, comprising:
   a housing configured such that a charging connector is connected thereto;
   a plurality of vehicle-side terminals individually accommodated into a plurality of cavities provided in the housing and configured to be individually connected to a plurality of charging terminals provided in the charging connector when the housing and the charging connector are connected;
   a retainer configured to retain the vehicle-side terminals accommodated in the cavities; and
   a relay circuit unit assembled into the retainer and having one end connected to one of the plurality of vehicle-side terminals and the other end connected to the vehicle-side terminal different from that connected to the one end out of the plurality of vehicle-side terminals,
   wherein:
   the relay circuit unit includes an electronic component with a pair of leads, a first relay terminal press-fittable into the retainer and to be connected to one of the leads in the electronic component and a second relay terminal press-fittable into the retainer and to be connected to the other lead in the electronic component; and
   the leads are pressed by the retainer to be respectively connected to lead connecting portions provided on the first and second relay terminals when the first and second relay terminals are press-fitted.

2. The vehicle-side connector according to claim 1, wherein the lead connecting portion includes a pair of pressure contact blades to be brought into pressure contact with the lead pushed by being pressed by the retainer.

3. The vehicle-side connector according to claim 1, wherein:
   the retainer includes holding grooves into which the vehicle-side terminals are mounted and held when the vehicle-side terminals are inserted into the cavities;
   the first and second relay terminals include a terminal connecting portion projecting into the holding groove and resiliently displaceable; and
   the vehicle-side terminal is pressed against the terminal connecting portion in a mounting direction when the vehicle-side terminal is mounted and held into the holding groove.

4. The vehicle-side connector according to claim 3, wherein:
   the first and second relay terminals include a press-fit portion to be press-fitted into the retainer; and
   the terminal connecting portion is bent and folded in a press-fitting direction of the press-fit portion after extending in a direction opposite to the press-fitting direction from an end part on a side opposite to the press-fitting direction.

5. The vehicle-side connector according to claim 4, wherein an end part of the lead connecting portion on a side opposite to the press-fitting direction covers the terminal connecting portion.

6. The vehicle-side connector according to claim 2, wherein:
   the electronic component is a resistor;
   the vehicle-side terminal to be connected to the first relay terminal is a vehicle-side ground terminal; and
   the vehicle-side terminal to be connected to the second relay terminal is a vehicle-side signal terminal.

7. The vehicle-side connector according to claim 1, wherein the first and second relay terminals are identically shaped.

* * * * *